United States Patent
Katsuma et al.

(10) Patent No.: US 7,995,290 B2
(45) Date of Patent: Aug. 9, 2011

(54) OBJECTIVE LENS, OPTICAL PICKUP DEVICE, AND OPTICAL RECORDING/REPRODUCING APPARATUS

(75) Inventors: Toshiaki Katsuma, Saitama (JP); Masao Mori, Saitama (JP); Tetsuya Ori, Saitama (JP); Yu Kitahara, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 259 days.

(21) Appl. No.: 12/466,545

(22) Filed: May 15, 2009

(65) Prior Publication Data

US 2009/0285079 A1    Nov. 19, 2009

(30) Foreign Application Priority Data

May 16, 2008    (JP) ................ P2008-129205

(51) Int. Cl.
*G02B 3/02* (2006.01)
*G11B 7/00* (2006.01)

(52) U.S. Cl. ... 359/719; 359/718; 359/720; 369/112.01; 369/112.23

(58) Field of Classification Search .............. 359/718, 359/719, 720; 369/112.23, 112.01
See application file for complete search history.

(56) References Cited

U.S. PATENT DOCUMENTS

| | | |
|---|---|---|
| 6,411,442 B1 | 6/2002 | Ota et al. |
| 6,512,640 B2 | 1/2003 | Ota et al. |
| 6,744,568 B2 | 6/2004 | Kitamura et al. |
| 7,345,829 B2 * | 3/2008 | Terashima et al. ............ 359/719 |
| 2003/0026006 A1 * | 2/2003 | Kitamura et al. ............. 359/719 |
| 2003/0081317 A1 | 5/2003 | Katsumata et al. |
| 2005/0018297 A1 * | 1/2005 | Ohta et al. .................... 359/566 |

FOREIGN PATENT DOCUMENTS

| | | |
|---|---|---|
| CN | 1576894 A | 2/2005 |
| CN | 1223872 C | 10/2005 |
| CN | 1236330 C | 1/2006 |
| JP | 2001-324673 A | 11/2001 |
| JP | 3712628 B2 | 11/2005 |

OTHER PUBLICATIONS

Chinese Office Action for Application No. 200910141264.8 dated May 12, 2010.

* cited by examiner

*Primary Examiner* — Evelyn A. Lester
(74) *Attorney, Agent, or Firm* — Birch, Stewart, Kolasch & Birch, LLP

(57) ABSTRACT

An objective lens for converging light emitted from a light source on an optical recording medium to record and reproduce information consists of a single lens having at least one aspheric surface. The following conditional expressions (1) to (3) are satisfied:

$$N \leq 1.75 \quad (1)$$

$$0.5 < f/f_1 < 0.6 \quad (2)$$

$$0.8 < d/(NA \cdot De) < 1.0 \quad (3)$$

where
  N denotes a refractive index,
  f denotes a focal length (mm),
  $f_1$ denotes a focal length (mm) of a light source side surface,
  d denotes a thickness (mm) on an optical axis,
  NA denotes a numerical aperture on an optical recording medium side, and
  De denotes an effective aperture (mm) of the light source side surface.

20 Claims, 14 Drawing Sheets

Example 1

US 7,995,290 B2

OBJECTIVE LENS, OPTICAL PICKUP DEVICE, AND OPTICAL RECORDING/REPRODUCING APPARATUS

CROSS-REFERENCE TO RELATED APPLICATIONS

This application is based upon and claims the benefit of priority from the Japanese Patent Application No. 2008-129205 filed on May 16, 2008; the entire contents of which are incorporated herein by reference.

BACKGROUND OF THE INVENTION

1. Technical Field

The invention relates to an objective lens, an optical pickup device, and an optical recording/reproducing apparatus. Specifically, the invention relates to an objective lens for use in an optical pickup apparatus for converging light emitted from a light source onto an optical recording medium to perform at least one of operations of recording and reproducing information, an optical pickup device having the objective lens, and an optical recording/reproducing apparatus equipped with the optical pickup device.

2. Description of the Related Art

Generally, various optical recording media such as DVD (digital versatile disk) and CD (compact disk) have been used in order to record audio information, video information, or data information for computer. As an amount of information to be handled rapidly increases, an increase in storage capacity density of an optical recording medium has been strongly demanded. It has been known that a decrease in wavelength of used light and an increase in numerical aperture (hereinafter, it is referred to as an NA) of an objective lens for an optical pickup device are effective to increase the storage capacity density of an optical recording medium. Recently, for a BD (blu-ray disk), a semiconductor laser having an output wavelength of about 405 nm is used as a light source and an objective lens having an NA of 0.7 or more is used. Such a blu-ray disk (hereinafter, it is referred to as BD) having a capacity of 25 GB per one layer of one side has been widely used in practice. In the specifications of the BD, an NA and a thickness of a protection layer of an optical recording medium are set totally different from values of DVD and CD. In the current specification, an NA is 0.85, and a thickness of a protection layer is 0.1 mm.

However, in future, as might be expected, an increase in density will be demanded more and more, but it may be hard to satisfy this demand by promoting a decrease in wavelength. This is because optical transmittance of lens materials is rapidly reduced in the range of a wavelength less than 350 nm and thus, it is hard to obtain sufficient optical efficiency in practice. For this reason, the other way for achieving high storage capacity density is to further increase an NA of the objective lens.

When an objective lens with a high numerical aperture (hereinafter, it is referred to as a high NA) for an optical pickup device is designed, a single lens structure is effective to solve problems such as an increase in process number at the time of assembly, deterioration in production efficiency, and an increase in cost. For example, known objective lenses for an optical pickup device having a relatively high NA single lens are described in JP 2001-324673 A (corresponding to U.S. Pat. Nos. 6,411,442 and 6,512,640) and Japanese patent No. 3712628 (corresponding to U.S. Pat. No. 6,744,568).

JP 2001-324673 A describes an objective lens that can achieve excellent image height characteristics by setting a ratio of a thickness d of the lens on the optical axis to a focal length f thereof in a predetermined range. Japanese patent No. 3712628 describes an aspheric objective lens having a light source side surface that is formed as a convex surface and an optical recording medium side surface that is formed in a shape substantially flatter than the light source side surface.

Meanwhile, in the high-NA objective lens for an optical pickup device, it is difficult to secure a working distance (WD) that can prevent collision between the lens and an optical recording medium while maintaining compactness of the lens system. In this point of view, the objective lens described in JP 2001-324673 A has a room for improvement. Also, in focusing and tracking controls, it is preferable to drive a lens at higher speed. For this reason, it is also required to reduce a weight of a lens.

However, in the objective lens described in Japanese patent No. 3712628, a refractive index of the lens component material is set high, and thus a weight of lens becomes large. In lens material, particularly in glass material, when a refractive index thereof is high, a specific gravity generally tends to increase. For example, a specific gravity of a material having a refractive index of about 1.60 is about 2.8, but a specific gravity of a material having a refractive index of about 1.85 is about 4.3. Accordingly, assuming that volumes of lenses are the same, a weight of a lens formed of a material having a refractive index of about 1.85 is 1.5 times as large as a weight of a lens formed of a material having a refractive index of about 1.60. This causes a problem in that it is difficult to drive a lens at a high speed in focusing and tracking controls since the weight of the lens described in Japanese patent No. 3712628 becomes large in any cases.

SUMMARY OF THE INVENTION

The invention has been made in view of the above circumstances and provides an objective lens capable of achieving reduction in weight with a sufficient working distance while maintaining high optical performance as an objective lens for an optical pickup device. The invention also provides an optical pickup device having the objective lens and an optical recording/reproducing apparatus equipped with the optical pickup device.

[1] According to an aspect of the invention, an objective lens for converging light emitted from a light source onto an optical recording medium to record and reproduce information consists of a single lens having at least one aspheric surface. The following conditional expressions (1) to (3) are satisfied:

$$N \leq 1.75 \tag{1}$$

$$0.5 < f/f1 < 0.6 \tag{2}$$

$$0.8 < d/(NA \cdot De) < 1.0 \tag{3}$$

where

N denotes a refractive index of the single lens, f denotes a focal length, in mm, of the single lens, f1 denotes a focal length, in mm, of a light source side surface of the single lens, d denotes a thickness, in mm, of the single lens on an optical axis, NA denotes a numerical aperture of the single lens on an optical recording medium side, and De denotes an effective aperture, in mm, of the light source side surface of the single lens.

[2] According to another aspect of the invention, an objective lens for converging light emitted from a light source onto an optical recording medium to record and reproduce information consists of a single lens having at least one aspheric surface. The following conditional expressions (1), (2), and (4) are satisfied:

$$N \leq 1.75 \quad (1)$$

$$0.5 < f/f1 < 0.6 \quad (2)$$

$$0.3 < d/Do < 0.8 \quad (4)$$

where
N denotes a refractive index of the single lens,
f denotes a focal length, in mm, of the single lens,
f1 denotes a focal length, in mm, of a light source side surface of the single lens,
d denotes a thickness, in mm, of the single lens on an optical axis, and
Do denotes an outer diameter, in mm, of the single lens.
f1 in the expression (2) is defined by the following expression (A):

$$f_1 = N \times R1/(N-1) \quad (A)$$

where N denotes the refractive index of the objective lens, and
R1 denotes a curvature of radium (mm) of the light source side surface of the objective lens near the optical axis.

Here, in this specification, the "near the optical axis" means a minute range including the optical axis and is also defined as a "paraxial range" in which approximation of sin φ=φ can be established when the angle of φ is defined between the optical axis and a straight line that connects the center of curvature of a lens with a point on a lens surface on which a ray is incident.

[3] Also, in the objective lens of any one of [1] to [2], the objective lens may be formed in a biconvex shape near the optical axis.

[4] Also, in the objective lens of any one of [1] to [3], an optical recording medium side surface of the objective lens may be formed in a convex shape near the optical axis, and be formed in a concave shape at a predetermined position distant from the optical axis.

[5] Also, in the objective lens of any one of [1] to [4], a mass of the objective lens may be equal to or less than 0.5 grams.

Here, the mass of objective lens means a mass of the whole objective lens. For example, when the objective lens has a flange portion that does not function to converge incident rays, it is defined as a mass including a mass of the flange portion.

[6] Also, in the objective lens of any one of [1] to [5], the following conditional expression (5) may be satisfied:

$$0.50 < g/d < 0.80 \quad (5)$$

where g denotes a distance, in mm, from a tangential plane that is perpendicular to the optical axis and is tangent to a vertex of the light source side surface of the single lens to a center of gravity of the single lens.

[7] Also, in the objective lens according of any one of [1] to [6], a numerical aperture of the single lens on the optical recording medium side may be not less than 0.70 and not more than 0.98.

[8] In the objective lens of any one of [1] to [7], a wavelength of the light may be not less than 400.0 nm and not more than 410.0 nm.

[9] In the objective lens of [8], the numerical aperture of the single lens on the optical recording medium side may be not less than 0.85, and a thickness of a protection layer of the optical recording medium may be not less than 0.075 mm and not more than 0.1 mm.

The sentence "the numerical aperture of the single lens on the optical recording medium side is not less than 0.85, and a thickness of the protection layer of the optical recording medium is not less than 0.075 mm and not more than 0.1 mm" means that the objective lenses of [1] and [2] can converge used light almost without aberration (for example, wavefront aberration is not more than 0.07 λRMS) while satisfying the above conditions.

[10] In the objective lens of [8], the numerical aperture of the single lens on the optical recording medium side may be not less than 0.85, an RMS (Root Means Square) of wavefront aberration may be set to be minimized at a position distant t1 mm from a surface of the optical recording medium toward the inside of the optical recording medium, and t1 may be not less than 0.075 mm and not more than 0.1 mm.

Here, N, f, $f_1$, NA, De, and wavefront aberration are values at the wavelength of used light.

Here, Do is defined as a diameter of an arc constituting an outer shape of the lens in consideration of the outer shape of the lens including a flange portion in a plane perpendicular to the optical axis.

Furthermore, the numerical aperture of the objective lens can be determined based on the focal length and the effective diameter or the aperture diameter that is determined by the aperture diaphragm disposed together with the objective lens, when the effective diameter or the aperture diameter is already known. However, when these value are unknown, the maximum lens diameter that can converge the used light almost without aberration (for example, wavefront aberration is not more than 0.07 λRMS) or the maximum lens diameter that can converge the used light to a spot diameter required to record or reproduce information is set as a practical effective diameter of the objective lens, and the numerical aperture can be determined based on this practical effective diameter.

[11] According to further another aspect of the invention, an optical pickup device includes the objective lens of any one of [1] to [10].

[12] According to still another aspect of the invention, an optical recording/reproducing apparatus includes the optical pickup device of [11].

Furthermore, the optical recording/reproducing apparatus may have only a function of recording or reproducing, and may have both of the functions of recording and reproducing. Further, the optical recording/reproducing apparatus may record onto one optical recording medium and reproduce from another optical recording medium. In addition, the optical recording/reproducing apparatus may record onto or reproduce from one optical information recording medium and record onto and reproduce from another optical information recording medium. The term "reproduce" includes merely reading information.

Since each of the objective lenses of [1] and [2] has at least one aspheric surface, it is possible to satisfactorily correct various aberrations. In addition, since each objective lens is formed of a single lens, it is possible to contribute to reduction in weight of lens. As a result, it is possible to reduce a weight of lens, which enables to drive the lens at a higher speed in focusing and tracking controls.

Furthermore, since the objective lenses of [1] and [2] satisfy the conditional expression (1), a lens material having a low refractive index can be used, and a specific gravity of a lens material, which has a tendency to increase in specific gravity in accordance with an increase in refractive index, can be set small. Therefore, it is possible to achieve reduction in weight of the lens. Thereby, it is possible to drive the lens at a high speed in the focusing and tracking controls.

Further, since the objective lens of [1] and [2] satisfy the conditional expression (2), it is possible to prevent an excessive increase in curvature of the optical recording medium side surface. Thereby, it is possible to reduce spherical aberration caused by the optical recording medium side surface. On the other hand, it is also possible to prevent an excessive increase in curvature of the light source side surface. As a result, it is possible to increase a working distance of the objective lens.

In addition, since the objective lens of [1] satisfies the conditional expression (3), it is possible to obtain favorable off-axis characteristics by satisfying the lower limit range thereof. On the other hand, by satisfying the upper limit range thereof, it is possible to decrease a weight and a volume of the objective lens. As a result, it is possible to drive the objective lens at a high speed during control.

Further, since the objective lens of [2] satisfies the conditional expression (4), it is possible to decrease a weight and a volume of the objective lens by satisfying the lower limit range thereof. Accordingly, it is possible to drive the objective lens at a high speed during control. On the other hand, by satisfying the upper limit range, it is possible to increase a working distance of the objective lens.

According to the above configurations, it is possible to provide an optical pickup device having the objective lens, which has the above-mentioned advantages, and the optical recording/reproducing apparatus.

DETAILED DESCRIPTION OF EMBODIMENTS OF THE INVENTION

Hereinafter, embodiments of the invention will be described with reference to the accompanying drawings.

Figure 3:
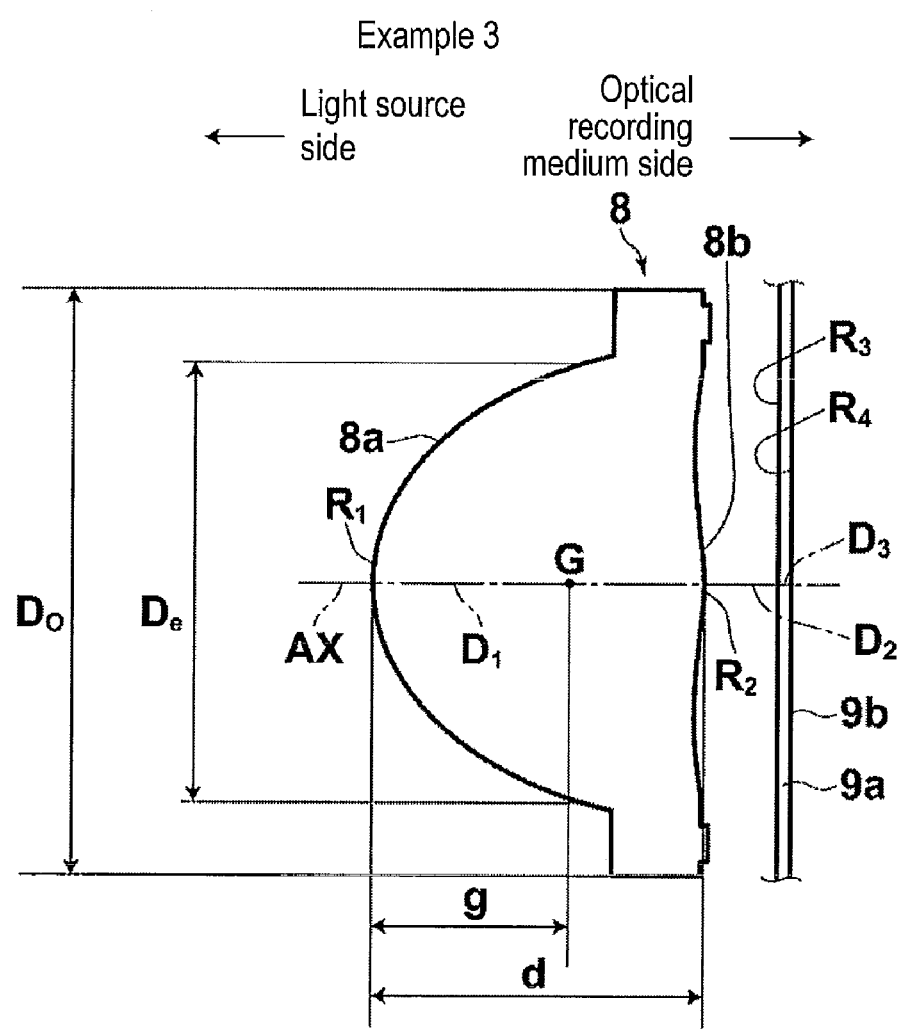
FIG. 3 is a sectional view schematically illustrating an objective lens according to Example 3 of the invention.
Figure 4:
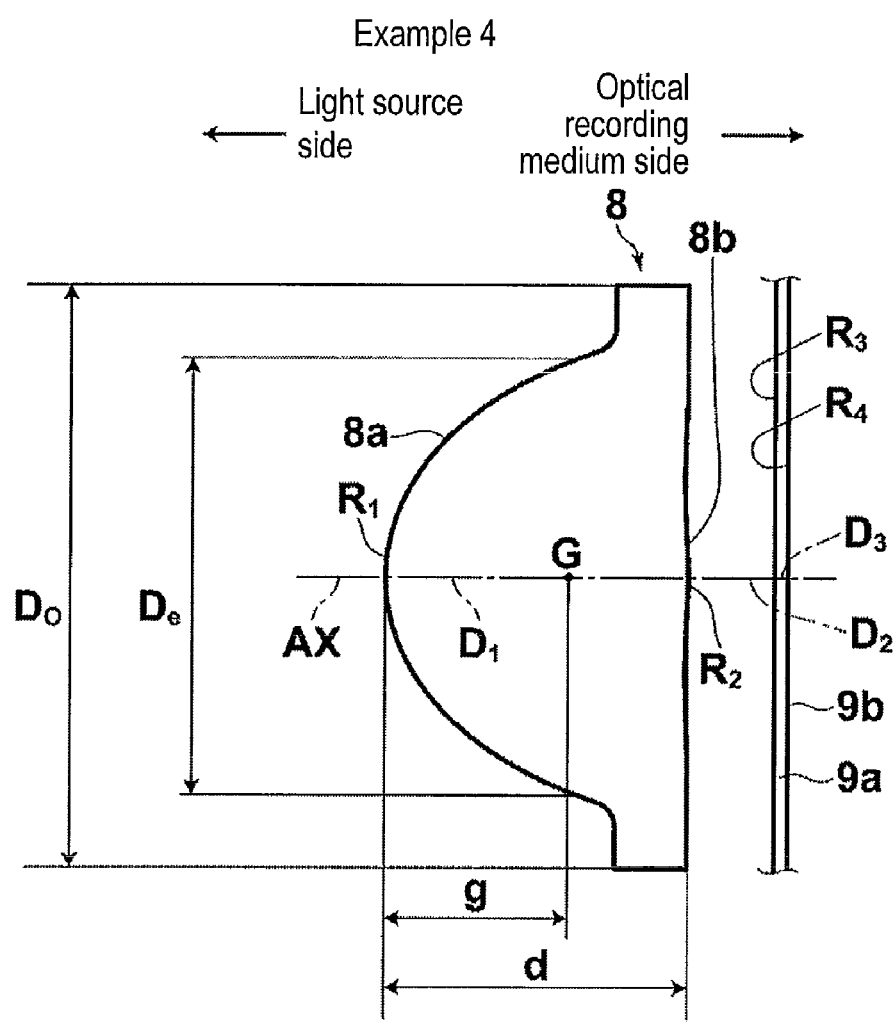
FIG. 4 is a sectional view schematically illustrating an objective lens according to Example 4 of the invention.
Figure 5:
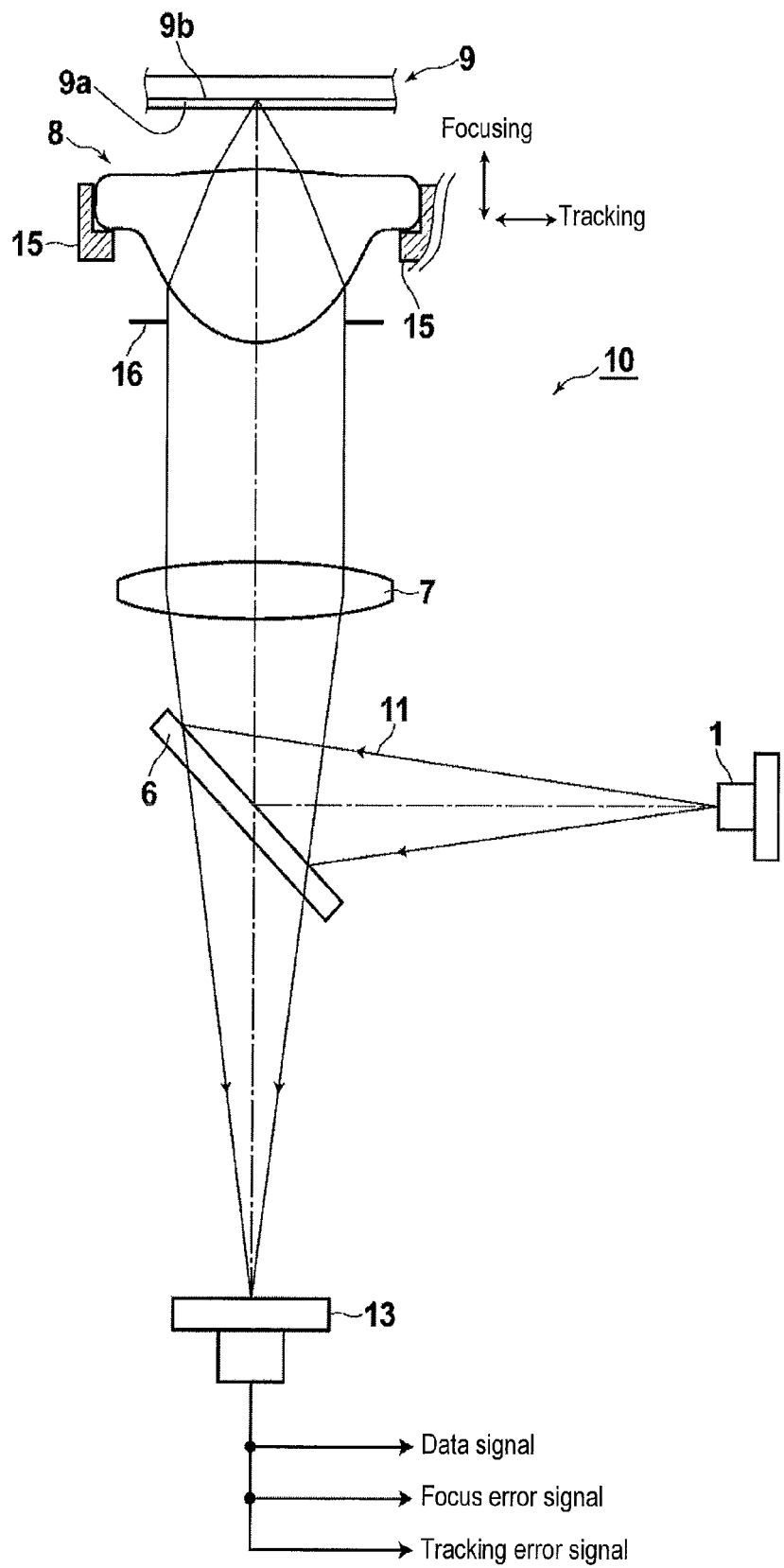
FIG. 5 is a schematic configuration view illustrating an optical pickup device according to an embodiment of the invention.

FIGS. 1 to 4 are sectional diagrams illustrating the configurations of objective lenses according to the embodiments of the invention, and correspond to objective lenses of Examples 1 to 4. FIG. 5 is a diagram illustrating the configuration of an optical pickup device according to an embodiment of the invention.

First, referring to FIG. 5, the optical pickup device 10 according to the embodiment of the invention will be described. Subsequently, the objective lenses according to the embodiments of the invention will be described in detail.

The optical pickup device 10 includes an objective lens 8 according to the embodiment of the invention, a semiconductor laser 1 serving as a light source, a half mirror 6 that is disposed obliquely at an angle of 45 degrees with respect to light emitted from the semiconductor laser 1, a collimator lens 7, and a photodiode 13. The optical pickup device 10 performs at least one of operations of recording and reproducing information by having the objective lens 8 converge the light, which is emitted from the semiconductor laser 1, onto an optical recording medium 9 which the information is to be recorded onto or reproduced from.

In the following description of the embodiment, an example in which the blu-ray disk is used as the optical recording medium 9 will be described, but the invention is not limited thereto. According to the recent specification of the blu-ray disk, an NA is 0.85, a wavelength of used light is 405 nm, and a thickness of a protection layer is 0.1 mm. However, a single layer disk and a double layer disk are different in position of an optical recording layer. That is, the optical recording layer of the single layer disk is disposed 0.100 mm from the surface thereof, and the optical recording layers of the double layer disk are disposed 0.075 mm and 0.100 mm from the surface thereof.

The optical pickup device 10 includes a lens holder 15 for holding the objective lens 8, and a mask 16 disposed on the light source side of the objective lens 8. The lens holder 15 is fixedly attached to a part of a peripheral side surface of a flange portion of the objective lens 8 and a part of a light source side flat surface of the flange portion of the objective lens 8, and is integrally formed with an actuator not shown in the drawing. A servo mechanism including this actuator performs tracking and focusing operations of the objective lens 8. The mask 16 has a predetermined aperture diameter so as to obtain a desired NA on the optical recording medium side of the objective lens 8.

The semiconductor laser 1 is a light source for emitting blue laser light having a wavelength of 405 nm. Furthermore, a light source emitting a laser light in a wavelength range of 400.0 nm to 410.0 nm may be employed in the embodiment of the invention.

The collimator lens 7, which is schematically shown in FIG. 5, is not limited to the single element configuration, and may be formed of plural lenses. The collimator lens 7 is adapted to make the light emitted from the semiconductor laser 1 incident on a light source side surface of the objective lens 8 in a state of parallel light rays.

A photodiode whose light receiving section is divided into four may be used as the photodiode 13.

Inside of the optical recording medium 9, pits (each of which is not necessary to have a physically concave shape) carrying signal information are arranged in a track shape, and an optical recording layer 9b which information can be recorded into and reproduced from is formed. A protection layer 9a transparent to light of the light source is formed between the objective lens side surface of the optical recording medium 9 and the optical recording layer 9b. A thickness of the protection layer 9a of the optical recording medium 9 is 0.1 mm. Either a single layer disk which has only a single optical recording layer or a double layer disk which has two optical recording layers may be employed as the optical recording medium 9 in this embodiments of the invention. FIG. 5 schematically shows the optical recording layer 9b, but the optical recording medium 9 is not limited to the single layer disk.

In the optical pickup device 10 having such a configuration, the laser light emitted from the semiconductor laser 1 is reflected by the half mirror 6 at an angle of 90 degrees with respect to an optical path, is substantially collimated by the collimator lens 7, and is converged by the refraction effect of the objective lens 8. The refraction effect causes the light exiting from the optical recording medium side surface of the objective lens 8 to be satisfactorily converged onto the optical recording layer 9b which information is to be recorded onto or reproduced from. At this time, the objective lens 8 is driven by the above-mentioned servo mechanism, and thereby, the converged light can be located on the optical recording layer 9b of the optical recording medium 9.

The reflected light from the optical recording layer 9b is transmitted through the objective lens 8, the collimator lens 7 and the half mirror 6 in a state where the light carries signal information, and is incident on the photodiode 13. The photodiode 13 outputs electric signals in response to respective light receiving amounts of the four segment parts of the light receiving section. Based on the electric signals, a calculation unit which is not shown performs a predetermined calculation, thereby obtaining a data signal, a focus error signal and a tracking error signal.

The half mirror 6 is inserted to have at an angle of 45 degrees with respect to the optical path of the returning light from the optical recording medium 9. Therefore, the light beams transmitted through the half mirror 6 have astigmatism. Thereby, an amount of the focus error is determined in accordance with a shape of a beam spot of the returning light on the four-divided photodiode 13. Generally, a method that causes astigmatism by use of a cylindrical lens to perform light detection has been known, and the half mirror 6 of this embodiment has the same function as the cylindrical lens in that method. In addition, it may be possible to detect a tracking error based on three beams separated by inserting an optical element such as a grating between the semiconductor laser 1 and the half mirror 6.

Hereinafter, the objective lens 8 according to the embodiments will be described with reference to FIGS. 1 to 4. The objective lens 8 is formed of a single lens. Since the objective lens is formed of a single lens, it is not necessary to adjust alignment between lenses at the time of assembly. As a result, it is possible to improve production efficiency and reduce costs.

Furthermore, at least one surface of the objective lens 8 is an aspheric surface, and it is preferable that both surfaces thereof be aspheric surfaces. It is more preferable that the aspheric surface be an aspheric surface that is rotationally symmetric and is represented by the following aspherical expression. By forming such a rotationally symmetric aspheric surface, it is possible to satisfactorily correct various aberrations such as spherical aberration and comatic aberration. Thus, it is possible to surely perform the focusing and tracking operations and satisfactorily perform the recording and reproducing operations.

Further, in the objective lens 8, it is preferable that the optical recording medium side surface of the objective lens 8 be formed in a convex shape near the optical axis, and be formed in a concave shape at a predetermined position distant from the optical axis. By forming the objective lens in such a shape, it is possible to satisfactorily correct spherical aberration, and the objective lens is configured to satisfactorily perform recording and reproducing. In addition, it is preferable that the shape of the aspheric surface formed on the objective lens 8 be appropriately set to satisfactorily correct aberrations so as to converge the used light onto the optical recording layer 9b.

$$Z = \frac{C \times Y^2}{1 + \sqrt{1 - K \times C^2 \times Y^2}} + \sum_{i=4}^{20} A_i |Y|^i$$

where Z denotes a length of a perpendicular drawn from a point on an aspheric surface, that is distant Y from the optical axis, to a tangential plane (plane perpendicular to the optical axis) for the aspheric vertex, Y denotes a distance from the optical axis, C denotes a curvature of the aspheric surface near the optical axis, K denotes a conic coefficient, and $A_i$ denotes an aspheric coefficient (i=4 to 20).

Further, the objective lens 8 is configured to satisfy the following conditional expressions (1) to (3) or the following conditional expressions (1), (2), and (4):

$$N \leq 1.75 \tag{1}$$

$$0.5 < f/f_1 < 0.6 \tag{2}$$

$$0.8 < d/(NA \cdot De) < 1.0 \tag{3}$$

$$0.3 < d/Do < 0.8 \tag{4}$$

where

N denotes a refractive index of the objective lens, f denotes a focal length (mm) of the objective lens, $f_1$ denotes a focal length (mm) of the light source side surface of the objective lens, d denotes a thickness (mm) of the objective lens on an optical axis, NA denotes a numerical aperture of the objective lens on the optical recording medium side, De denotes an effective aperture (mm) of the light source side surface of the objective lens, and Do denotes an outer diameter (mm) of the objective lens.

The conditional expression (1) defines a value of refractive index N of a material constituting the objective lens 8. By satisfying the conditional expression (1), a specific gravity of a lens material, which has a tendency to increase in specific gravity in accordance with an increase in refractive index, can be set small. As described above, generally, a specific gravity of a material having a refractive index of 1.85 becomes 1.5 times as large as a specific gravity of a material having a refractive index of 1.60, and a weight thereof becomes large in accordance therewith. Accordingly, generally, when a material having a refractive index of about 1.8 or more, that is, an ultrahigh refractive index, it becomes difficult to drive a lens at a high speed in focusing and tracking controls. Since a refractive index N of the material of this embodiment is equal to or less than 1.75 so as to satisfy the conditional expression (1), it is possible to reduce a weight of lens. As a result, it is possible to drive the lens at a high speed in focusing and tracking controls.

Figure 1:
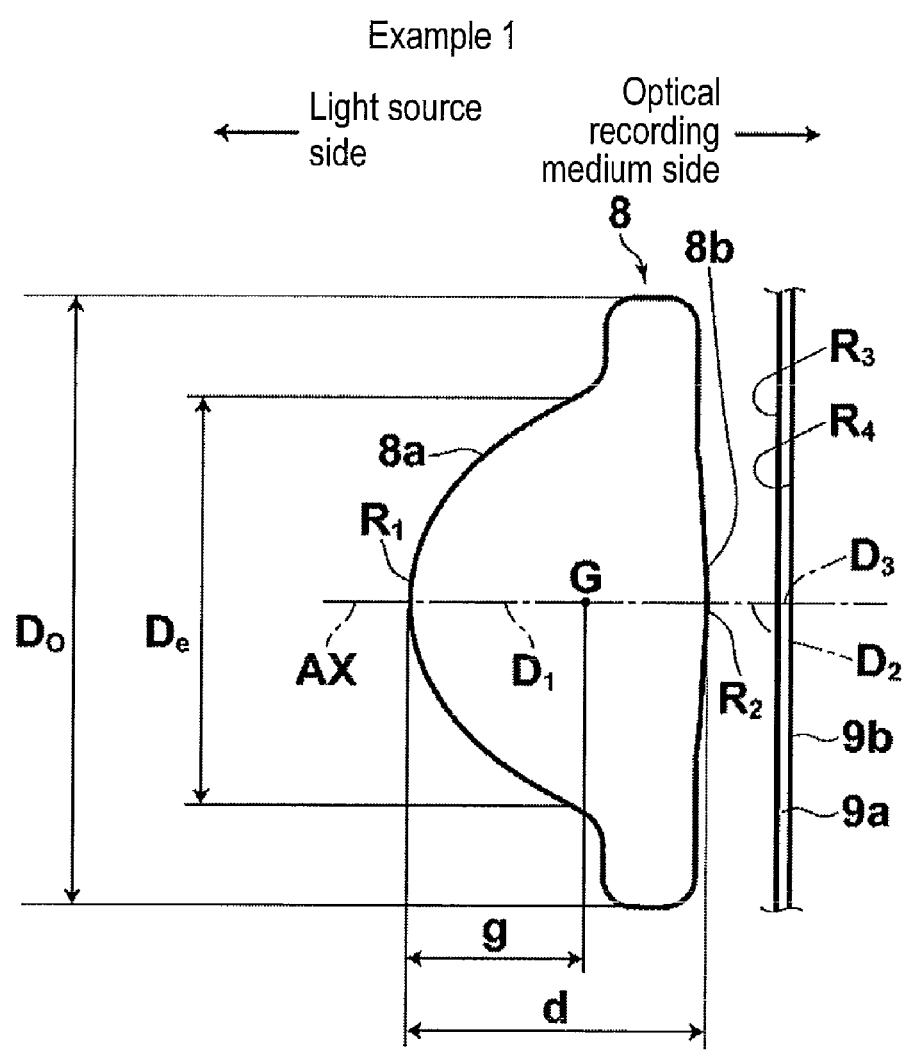
FIG. 1 is a sectional view schematically illustrating an objective lens according to Example 1 of the invention.

In the objective lens 8 of this embodiment, when a material having a refractive index that satisfies the conditional expression (1) is selected, it is preferable to form the objective lens in a biconvex shape near the optical axis as the example shown in FIG. 1. When a material having a refractive index of 1.75 or less is used, the biconvex lens shape has a larger effect in correcting spherical aberration than a positive meniscus lens shape. In addition, when a material having a refractive index of 1.69 or less is used, this effect in correcting spherical aberration becomes larger.

The conditional expression (2) defines a ratio of the focal length f of the objective lens 8 to the focal length $f_1$ of the light source side surface of the objective lens 8. By satisfying the lower limit range of the conditional expression (2), it is possible to prevent that a curvature of the optical recording medium side surface of the objective lens 8 becomes excessively large. Therefore, it is possible to decrease spherical aberration caused by the optical recording medium side surface of the objective lens 8. Furthermore, by satisfying the upper limit range of the conditional expression (2), it is possible to prevent that curvature of the light source side surface of the objective lens 8 becomes excessively large. As a result, it is possible to increase a working distance thereof.

The conditional expression (3) defines a range of a ratio of the thickness d of the objective lens 8 on the optical axis to a value obtained by multiplying the effective aperture De of the objective lens 8 by the numerical aperture NA of the objective lens 8 on the optical recording medium side. By satisfying the lower limit range of the conditional expression (3), it is possible to obtain favorable off-axis characteristics. Also, by satisfying the upper limit range of the conditional expression (3), it is possible to suppress the thickness of the objective lens 8 and decrease a weight and a volume thereof. As a result, it is possible to drive the objective lens 8 at a high speed during control.

The conditional expression (4) defines a range of a ratio of the thickness d of the objective lens 8 on the optical axis to the outer diameter Do of the objective lens 8. By satisfying the lower limit range of the conditional expression (4), it is possible to suppress the outer diameter of the objective lens 8 and decrease a weight and a volume thereof. As a result, it is possible to drive the objective lens 8 at a high speed during control. By satisfying the upper limit range of the conditional expression (4), it is possible to suppress the thickness of the objective lens 8 so that a working distance of the objective lens 8 can be increased.

Figure 14A:
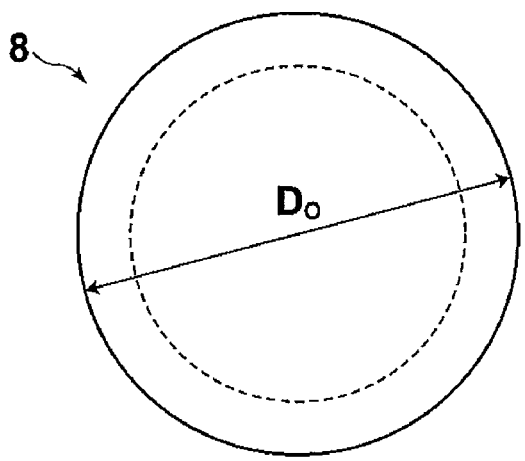
FIG. 14A is a view for explaining an outer diameter Do of the objective lens according to an embodiment of the invention.
Figure 14B:
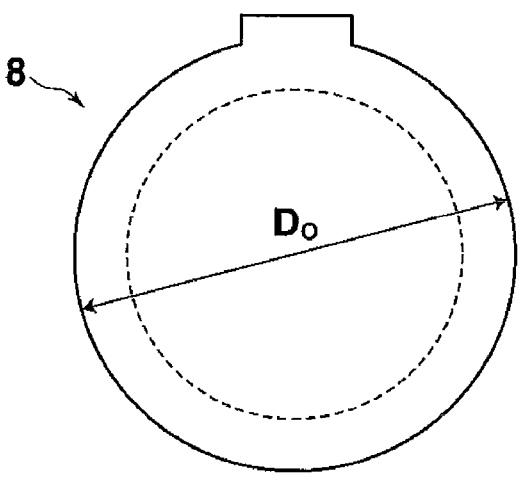
FIG. 14B is a view for explaining the outer diameter Do of the objective lens according to an embodiment of the invention.
Figure 14C:
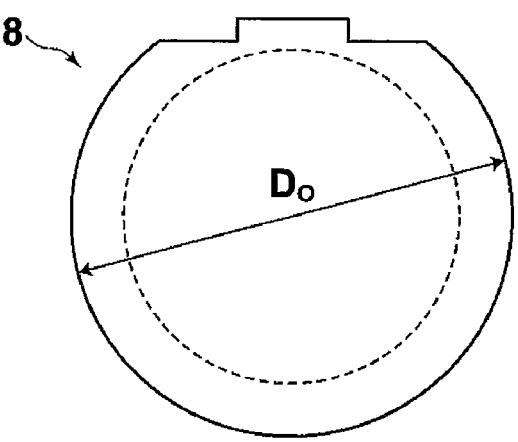
FIG. 14C is a view for explaining the outer diameter Do of the objective lens according to an embodiment of the invention.
Figure 14D:
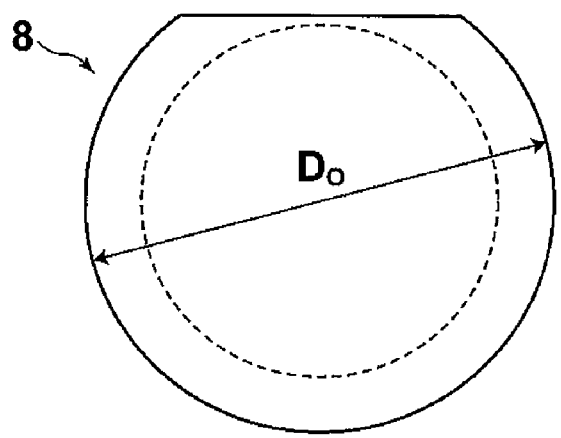
FIG. 14D is a view for explaining the outer diameter Do of the objective lens according to an embodiment of the invention.

Here, the outer diameter Do of the objective lens 8 used in the conditional expression (4) is defined as a diameter of an arc constituting an outer shape of a lens in consideration of the outer shape of the lens including a flange portion in a plane perpendicular to the optical axis AX. The Do will be described with reference to FIGS. 14A to 14D. Each solid line shown in FIGS. 14A to 14D represents the outer shape of the objective lens having the flange portion when viewed from the optical axis direction. In FIGS. 14A to 14D, each dotted line denotes an outer diameter of an area that has a curved lens surface in the light source side surface, and the so-called flange portion exists between the dotted line and the solid line representing the outer shape of the objective lens 8. The shape of the flange portion when viewed from the optical axis direction may not be a perfect ring shape as shown in FIG. 14A, and may be a shape a part of which is not a ring shape as shown in FIGS. 14B to 14D. However, normally, a half or more of the outer shape of the flange portion is formed as an arc. Therefore, even if the whole area of the outer shape of the objective lens 8 is not an arc, a diameter of the arc constituting the outer shape of the objective lens 8 is defined as the outer diameter Do of the objective lens 8.

Figure 16:
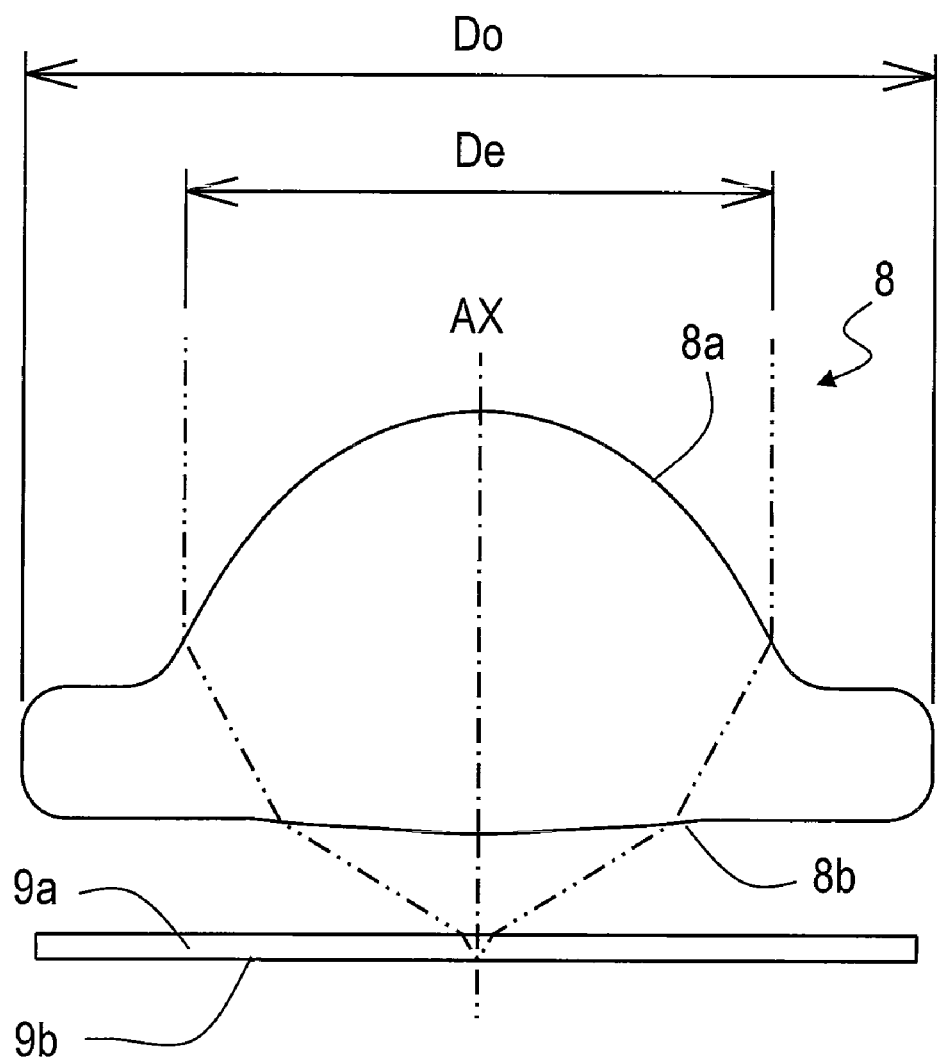
FIG. 16 shows a relationship between the effective diameter De and the outer diameter Do of the objective lens.

The "effective aperture" of the objective lens is, for example, defined as that "a maximum diameter of an area, on a surface of the objective lens, which should collect light rays and energy passing through the objective lens and transmit the light rays and energy to an optical recording medium, a final detector or the like, wherein the light rays (effective light rays) pass through the area." In specific optical systems, the area through which the effective light rays pass changes depending on an aperture diameter of an aperture diaphragm and the like. However, the "maximum diameter of the area through which the effective light rays pass" are determined by the design of the objective lens itself. FIG. 16 shows a relationship between the effective diameter De and the outer diameter Do of the objective lens 8. In FIG. 16, the double-dashed lines represent trajectories of light rays that pass through the outer ends of the effective diameter De of the objective lens 8.

By satisfying the following conditional expression (4-1) instead of the conditional expression (4), it is possible to make better the above-mentioned effect of the conditional expression (4).

$$0.4<d/Do<0.6 \qquad (4\text{-}1)$$

In the objective lens 8 of this embodiment, it is preferable to satisfy the following conditional expression (5) or (6).

$$0.50<g/d<0.80 \qquad (5)$$

$$25<v \qquad (6)$$

where g denotes a distance (mm) from a tangential plane that is perpendicular to the optical axis AX and tangent to a vertex of the light source side surface to a center of gravity of the objective lens 8, and v denotes an Abbe number of the objective lens 8 at the d-line.

The conditional expression (5) defines an appropriate range of the center of gravity G of the objective lens 8 in consideration of the case where the objective lens 8 is mounted on the optical pickup device is driven. Specifically, in the conditional expression (5), in order to secure stable operations of the optical pickup device, the following conditions are considered. The center of gravity G of the objective lens should not be set at position excessively distant from the central position thereof in a thickness on the optical axis. The objective lens for an optical pickup device is formed in such a shape that a convex surface with a large curvature is directed toward the light source. Because of these conditions, unless the center of gravity G of the objective lens is set in a predetermined range closer to the optical recording medium than the central position thereof in the thickness on the optical axis, the shape of the objective lens renders the operation of the optical pickup device unstable, and restricts degree of freedom in lens design severely. In consideration of a range capable of solving these problems, the conditional expression is defined. As a result, by satisfying the conditional expression (5), it is possible to secure a stable operation of the optical pickup device without loss of degree of freedom in lens design.

The conditional expression (6) defines that the Abbe number v of a material of the lens is greater than 25. By setting the range in the conditional expression (6), it is possible to prevent that chromatic aberration becomes excessively large. Accordingly, even if a wavelength of light emitted from the light source is fluctuated, it is possible to prevent problems that an image point moves, a beam spot blurs, and so on. In order to prevent that chromatic aberration becomes excessively large, it is preferable that the Abbe number v of the material of the lens be not less than 35.

In the objective lens 8 of this embodiment, it is preferable that an NA of the lens on the optical recording medium side be not less than 0.70 and not more than 0.98. By setting the NA to be in the range of 0.70 to 0.98, it is possible to reduce a diameter of a spot where light is converged onto the optical recording layer 9*b* of the optical recording medium 9. As a result, it is possible to perform recording and reproducing with high density. It is also possible to record onto and reproduce from, with higher density, a new optical recoding medium which will be developed in future. In the objective lens 8 of this embodiment, it is preferable that an NA be not less than 0.85. In this case, the above-mentioned advantages can be obtained, and the objective lens becomes compatible with an NA prescribed by the present specifications of the blu-ray disk.

It is preferable for the objective lens 8 of this embodiment to satisfactorily converge light onto the optical recording medium so that information can be recorded and reproduced when the light emitted from the light source is not less than 400.0 nm and not more than 410.0 nm. Although a wavelength prescribed in the specifications of the blu-ray disk is 405 nm, an output wavelength of a semiconductor laser is not always stabilized, and output wavelengths of individual semiconductor lasers are different. Accordingly, it is preferable to employ the objective lens capable of dealing with those mentioned above.

In the objective lens 8 of this embodiment, when a thickness of the protection layer 9*a* of the optical recording medium 9 is in not less than 0.075 mm and not more than 0.1 mm, it is preferable that a fine image be formed at a position in that range of thickness.

Furthermore, in the objective lens 8 of the embodiment, when a RMS of wavefront aberration is set to be minimized at a position distant t1 (mm) from a surface of the optical recording medium toward the inside of the optical recording medium, it is preferable that the t1 be not less than 0.075 mm and not more than 0.1 mm.

In a double layer disk, the condition of t1 is a condition for forming fine images on positions of both recording layers when the recording layers are provided at positions distant 0.075 mm and 0.100 mm from the objective lens side surface of the recording medium toward the inside of the medium, respectively. When t1 is outside that range, great difference is caused between image formation states of the two surfaces of the recording layers since an image formed at one of the two recording layers is fine but an image formed at the other recording layer is deteriorated.

Further, the condition of t1 is a condition for minimizing load on the optical pickup apparatus as small as possible, such as a lens movement distance for aberration correction when the optical pickup device has an aberration correction device that, for example, moves the lens in the optical axis direction for adjustment, in order to improve the state of image formation on the recording surface positions. With such a configuration, it is possible to shorten a time for aberration correction.

In the objective lens 8 of this embodiment, a smaller mass of the lens is more advantageous in order to reduce load on the actuator for performing a focus control and a tracking control at the time of recording onto or reproducing from a high density recording medium. For example, it is preferable that a mass of the lens be not more than 0.5 grams. It is more preferable that a mass of the lens be not more than 0.1 gram, and it is further preferable that a mass of the lens be not more than 0.02 grams.

The objective lens 8 may be made of plastic. Exemplary advantages of using plastic materials include reduction in manufacturing costs, reduction in weight, fast recording and reading because of the reduction in weight, and improvement in processability of a mold.

Alternatively, the objective lens 8 may be made of glass. Exemplary advantages of using glass materials include excellent resistance to temperature and humidity, and ease of acquisition of materials which has less deterioration in transmittance even if short wavelength light is applied for a long time.

Hereinafter, the objective lens of the embodiments of the invention will be described in detail with reference to the following examples.

EXAMPLES

FIGS. 1 to 4 are lens sectional views of the objective lenses according to Examples 1 to 4. FIGS. 6 to 9 are on-axis wavefront aberration views. FIGS. 10 to 13 show variations of wavefront aberrations relative to thicknesses of a protection layer. FIGS. 1 to 4 show the protection layer 9*a* and the conceptual recording layer 9*b* of the optical recording medium 9.

Example 1

The objective lens 8 according to Example 1 is formed of a single lens made of glass. As shown in FIG. 1, the light source side surface 8*a* and the optical recording medium side surface 8*b* are convex surfaces near the optical axis, and the light source side surface 8*a* is the convex surface having a larger curvature than the optical recording medium side surface 8*b*. Furthermore, both the surfaces of the objective lens 8 according to this example are aspheric surfaces each of which is rotationally symmetric.

In the upper part of the following Table 1, surface numbers are assigned so as to sequentially increase as it gets closer to the optical recording medium side from the light source side when the light source side surface is numbered as 1. The upper part thereof also shows the following items as lens data of the objective lens 8 according to Example 1: radiuses of curvature R (mm) of surfaces; on-axis surface spacings D (mm); and refractive indices N at a wavelength of the used light. In the column of radius of curvature, if the corresponding surface is aspheric, its radius of curvature is described as aspheric surface. Furthermore, the lens data includes data of the protection layer 9*a* of the optical recording medium 9.

Furthermore, the middle part of the following Table 1 shows the following items as aspheric surface data of the objective lens 8 according to Example 1: a curvature C near the optical axis; aspheric coefficients K; and $A_4$ to $A_{20}$ (only even-order coefficients) in the aspheric expression mentioned above. For C in the aspheric surface data, if the aspheric surface is convex toward the light source side, the algebraic sign of C is positive; if the aspheric surface is convex toward the optical recording medium side, the algebraic sign of C is negative. "E−j" (j: integer) used in the numeral values of K and $A_4$ to $A_{20}$ means "$\times 10^{-j}$", and "E+0" means "$\times 10^0$". In the middle part of Table 1, the light source side surface 8a of the objective lens is designated as a first surface, and the optical recording medium side surface 8b is designated as a second surface.

Furthermore, the lower part of the following Table 1 shows various data of the objective lens 8 according to Example 1. A wavelength λ denotes a wavelength of the used light (design wavelength), and numerical values of the various data shown in the lower part of Table 1, except for the Abbe number, is based on the wavelength of the used light. The Abbe number is measured at the d-line. The working distance WD is a distance from a vertex of the optical recording medium side surface to the objective lens side surface of the optical recording medium. The thickness t1 of the protection layer is a thickness of the protection layer from the objective lens side surface of the optical recording medium to a position at which an RMS of wavefront aberration takes the minimum value. The on-axis wavefront aberration is a value at the position of the thickness t1. The off-axis wavefront aberration is a value at a total angle of view of 1 degree. Furthermore, meaning of the above-mentioned data is the same in Examples 2 to 4.

TABLE 1

Example 1

<Lens Data>

| Surface | Radius of curvature R (mm) | Surface spacing D (mm) | Refractive index N |
|---|---|---|---|
| 1 | Aspheric | 1.447 | 1.605 |
| 2 | Aspheric | 0.343 | 1.000 |
| 3 | ∞ | 0.0875 | 1.619 |
| 4 | ∞ | | |

<Aspheric Surface Data>

| | 1st surface | 2nd surface |
|---|---|---|
| C | 1.214757025 | −0.563541950 |
| K | 2.324847420E−01 | 1.071518972E+00 |
| $A_4$ | 6.523776124E−02 | 1.636467661E+00 |
| $A_6$ | 6.801866828E−02 | −6.320648469E+00 |
| $A_8$ | −1.574817411E−01 | 1.597136639E+01 |
| $A_{10}$ | 5.795272288E−01 | −2.781930450E+01 |
| $A_{12}$ | −9.837283446E−01 | 3.224527681E+01 |
| $A_{14}$ | 8.968530874E−01 | −2.262496781E+01 |
| $A_{16}$ | −3.536943856E−01 | 7.291371700E+00 |
| $A_{18}$ | 0.000000000E+00 | 0.000000000E+00 |
| $A_{20}$ | 0.000000000E+00 | 0.000000000E+00 |

<Various Data>

| | |
|---|---|
| Wavelength λ (nm) | 405.00 |
| NA | 0.850 |
| Focal length f (mm) | 1.1760 |
| Back focal length bf (mm) | 0.3966 |
| Refractive index N | 1.605 |
| Focal length of light source side surface $f_1$ | 2.183 |
| Thickness of lens on optical axis d (mm) | 1.447 |
| Effective aperture $D_e$ | 2.00 |
| Outer diameter $D_O$ | 3.00 |
| Working distance WD (mm) | 0.343 |
| g (mm) | 0.862 |
| Mass (grams) | 0.016 |
| Abbe number ν | 59.96 |

TABLE 1-continued

Example 1

| | |
|---|---|
| t1 (mm) | 0.0875 |
| On-axis wavefront aberration (λRMS) | 0.0009 |
| Off-axis wavefront aberration (λRMS) | 0.017 |

Figure 6:
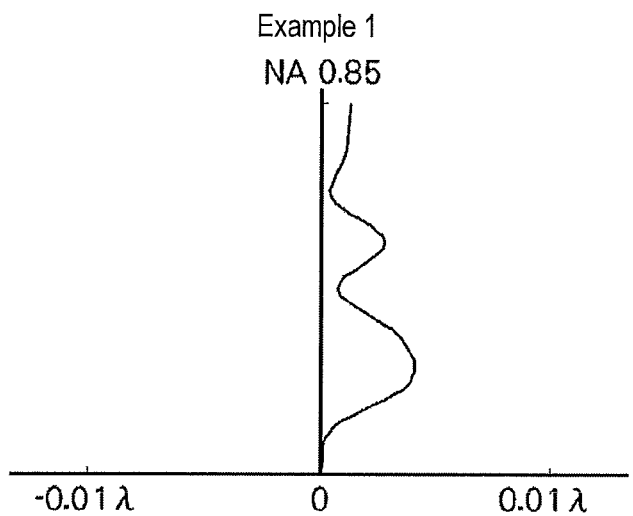
FIG. 6 is a wavefront aberration view illustrating the objective lens according to Example 1 of the invention.

The objective lens according to Example 1 can achieve a large NA of 0.85 when a wavelength λ of the used light is 405.0 nm. In addition, as shown in FIG. 6 and the value of the on-axis wavefront aberration in Table 1, the wavefront aberration is good, and the lens can satisfactorily converge the used light onto the optical recording layer 9b of the optical recording medium 9. Further, the objective lens according to Example 1 is configured to secure the sufficient working distance of 0.343 mm as shown in Table 1. Also, since the off-axis wavefront aberration is 0.017 λRMS as shown in Table 1, the lens according to the Example 1 can achieve excellent image height characteristic. Also, the lens according to Example 1 can achieve reduction in weight, that is, a mass thereof is 0.016 grams, as shown in Table 1.

Figure 10:
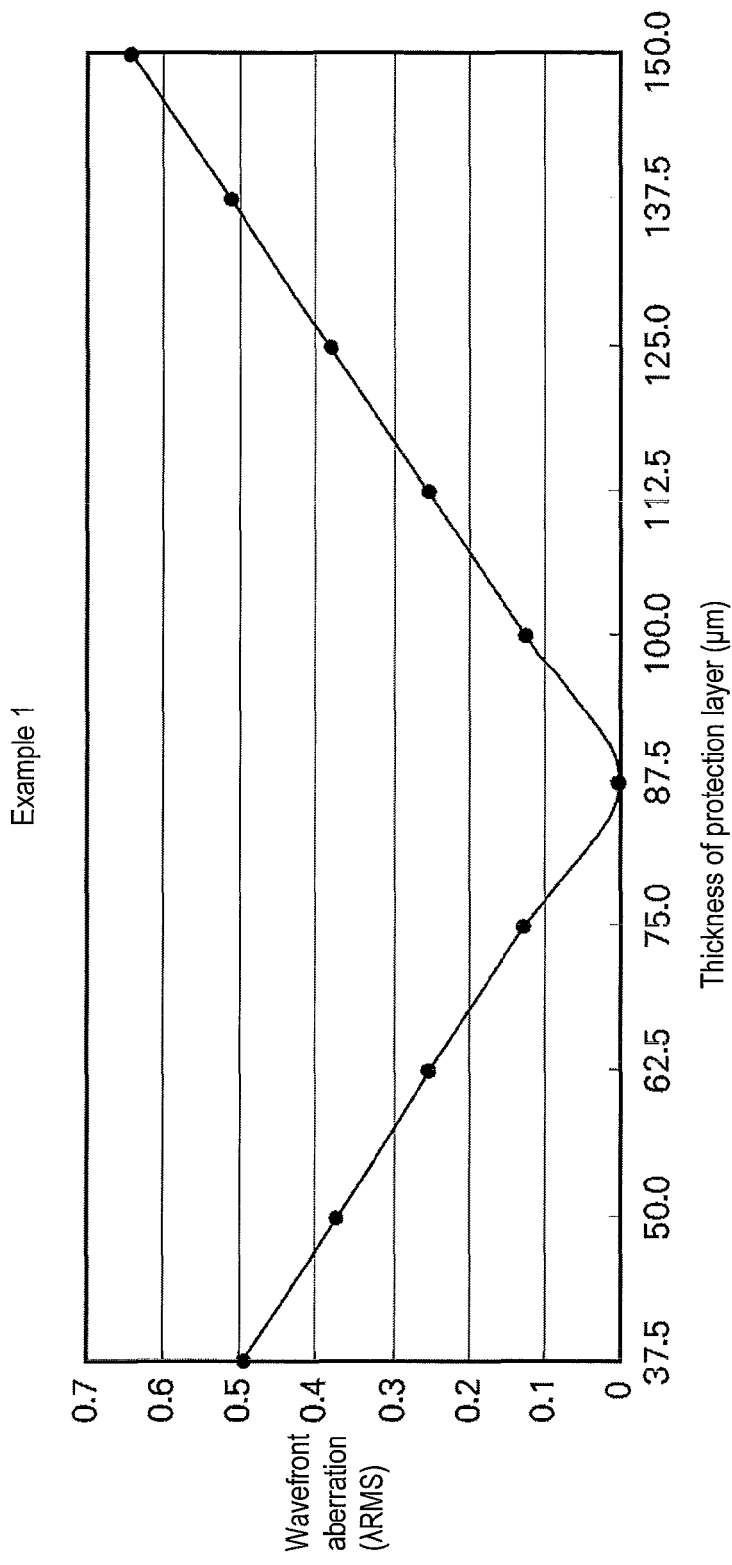
FIG. 10 is a view illustrating relationship between wavefront aberration and a thickness of a protection layer of the objective lens according to Example 1 of the invention.

In the objective lens 8 according to Example 1, the optical recording medium 9 is assumed as a double layer disk, and in order to deal with the double layer disk, aberration is set so that aberrations are corrected well at an intermediate position between the two recording layers. Consequently, the objective lens according to Example 1 is configured to minimize a wavefront aberration at the position distant 0.0875 mm from the surface of the optical recording medium 9, and the on-axis wavefront aberration at this position is 0.0009 λRMS, as shown in FIG. 10.

Example 2

Figure 2:
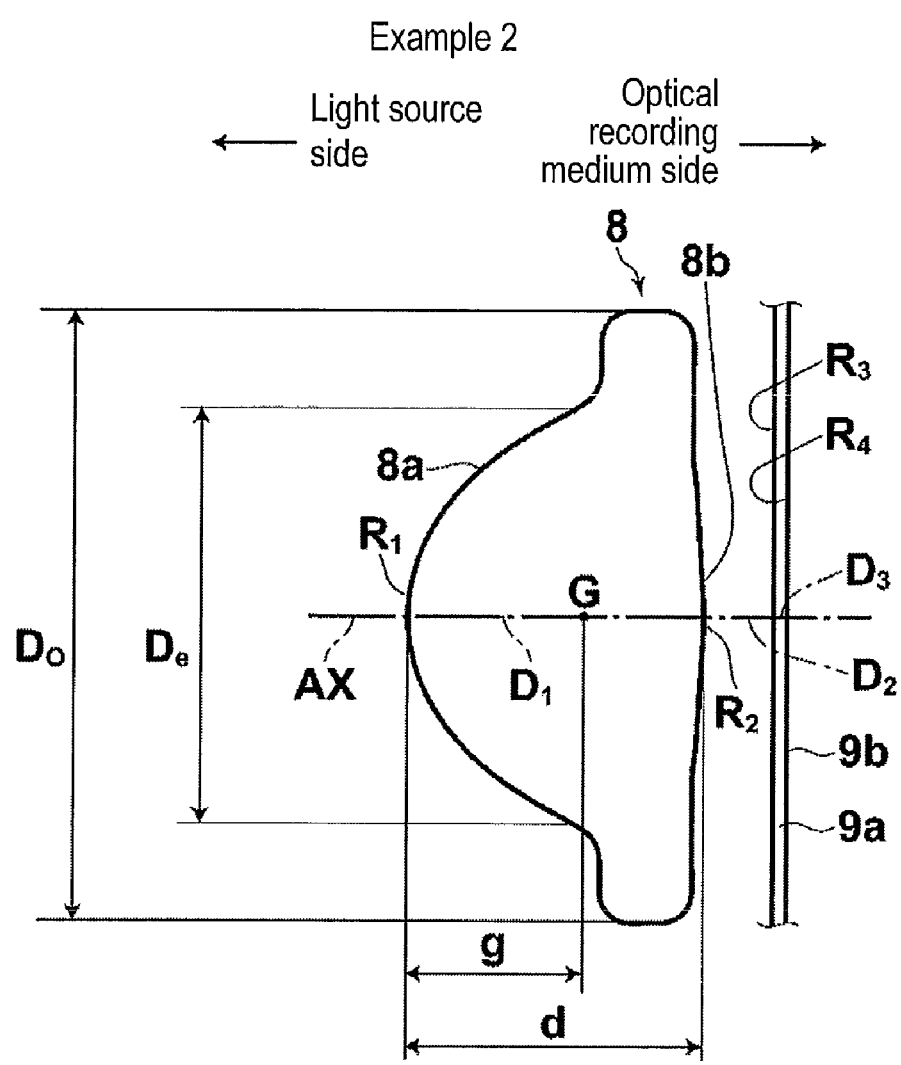
FIG. 2 is a sectional view schematically illustrating an objective lens according to Example 2 of the invention.

The objective lens 8 according to Example 2 is formed of a single lens made of glass. As shown in FIG. 2, the light source side surface 8a and the optical recording medium side surface 8b are convex surfaces near the optical axis, and the light source side surface 8a is the convex surface having a larger curvature than the optical recording medium side surface 8b. Furthermore, both the surfaces of the objective lens 8 according to this example are aspheric surfaces each of which is rotationally symmetric.

As for data according to Example 2, the upper part of the following Table 2 shows lens data, the middle part thereof shows aspheric surface data, and the lower part thereof shows various data.

TABLE 2

Example 2

<Lens Data>

| Surface | Radius of curvature R (mm) | Surface spacing D (mm) | Refractive index N |
|---|---|---|---|
| 1 | Aspheric | 1.447 | 1.605 |
| 2 | Aspheric | 0.337 | 1.000 |
| 3 | ∞ | 0.1000 | 1.619 |
| 4 | ∞ | | |

<Aspheric Surface Data>

| | 1st surface | 2nd surface |
|---|---|---|
| C | 1.211757025 | −0.569673325 |
| K | 2.231072347E−01 | 9.067227885E−01 |
| $A_4$ | 6.679499460E−02 | 1.623953466E+00 |

TABLE 2-continued

Example 2

| | | |
|---|---|---|
| $A_6$ | 7.115742222E−02 | −6.252104914E+00 |
| $A_8$ | −1.718328591E−01 | 1.583893475E+01 |
| $A_{10}$ | 6.174314551E−01 | −2.792750177E+01 |
| $A_{12}$ | −1.038716835E+00 | 3.304041599E+01 |
| $A_{14}$ | 9.369370245E−01 | −2.378315428E+01 |
| $A_{16}$ | −3.649461167E−01 | 7.870630127E+00 |
| $A_{18}$ | 0.000000000E+00 | 0.000000000E+00 |
| $A_{20}$ | 0.000000000E+00 | 0.000000000E+00 |

<Various Data>

| | |
|---|---|
| Wavelength λ (nm) | 405.00 |
| NA | 0.850 |
| Focal length f (mm) | 1.1760 |
| Back focal length bf (mm) | 0.3985 |
| Refractive index N | 1.605 |
| Focal length of light source side surface $f_1$ | 2.189 |
| Thickness of lens on optical axis d (mm) | 1.447 |
| Effective aperture $D_e$ | 2.00 |
| Outer diameter $D_O$ | 3.00 |
| Working distance WD (mm) | 0.337 |
| g (mm) | 0.861 |
| Mass (grams) | 0.014 |
| Abbe number ν | 59.96 |
| t1 (mm) | 0.1000 |
| On-axis wavefront aberration (λRMS) | 0.0010 |
| Off-axis wavefront aberration (λRMS) | 0.017 |

Figure 7:
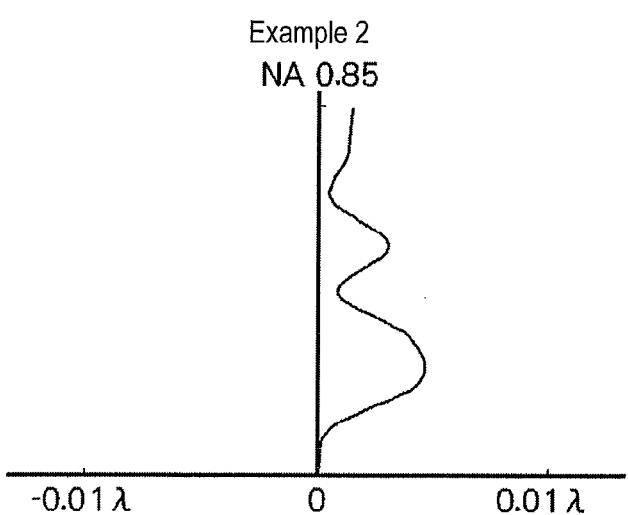
FIG. 7 is a wavefront aberration view illustrating the objective lens according to Example 2 of the invention.

The objective lens according to Example 2 can achieve a large NA of 0.85 when a wavelength λ of the used light is 405.0 nm. In addition, as shown in FIG. 7 and the value of on-axis wavefront aberration in Table 2, the wavefront aberration is good, and the lens can satisfactorily converge the used light onto the optical recording layer 9b of the optical recording medium 9. Further, the objective lens according to Example 2 is configured to secure a sufficient working distance of 0.337 mm as shown in Table 2. Also, since the off-axis wavefront aberration is 0.017 λRMS as shown in Table 2, the lens according to the Example 2 can achieve excellent image height characteristics. Also, the lens according to the Example 2 can achieve reduction in weight, that is, a mass thereof is 0.014 grams, as shown in Table 2.

Figure 11:
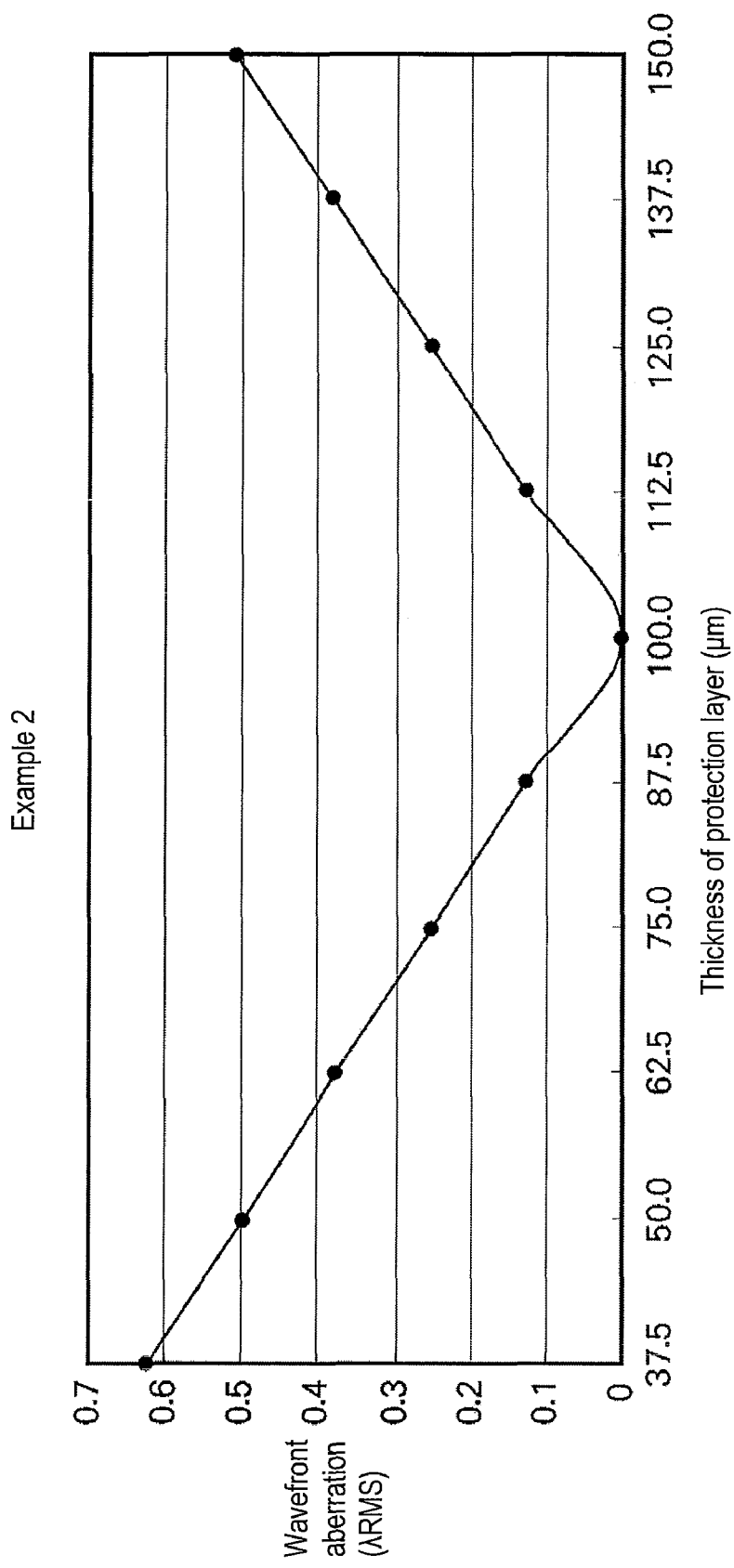
FIG. 11 is a view illustrating relationship between wavefront aberration and a thickness of a protection layer of the objective lens according to Example 2 of the invention.

In the objective lens 8 according to Example 2, the optical recording medium 9 is assumed as a single layer disk. The objective lens according to Example 2 is configured to minimize a wavefront aberration at the position distant 0.1 mm from the surface of the optical recording medium 9, and the on-axis wavefront aberration at this position is 0.0010 λRMS, as shown in FIG. 11.

Example 3

The objective lens 8 according to Example 3 is formed of a single lens made of plastic. As shown in FIG. 3, the light source side surface 8a and the optical recording medium side surface 8b are convex surfaces near the optical axis, and the light source side surface 8a is the convex surface having a larger curvature than the optical recording medium side surface 8b. Furthermore, both the surfaces of the objective lens 8 according to this example are aspheric surfaces each of which is rotationally symmetric. Furthermore, the optical recording medium side surface of the objective lens 8 of this example is formed in a convex shape near the optical axis and is formed in a concave shape at a predetermined position distant from the optical axis AX.

As for data according to Example 3, the upper part of the following Table 3 shows lens data, the middle part thereof shows aspheric surface data, and the lower part thereof shows various data.

TABLE 3

Example 3

<Lens Data>

| Surface | Radius of curvature R (mm) | Surface spacing D (mm) | Refractive index N |
|---|---|---|---|
| 1 | Aspheric | 2.253 | 1.525 |
| 2 | Aspheric | 0.502 | 1.000 |
| 3 | ∞ | 0.1000 | 1.618 |
| 4 | ∞ | | |

<Aspheric Surface Data>

| | 1st surface | 2nd surface |
|---|---|---|
| C | 0.877164470 | −0.630277255 |
| K | 4.496547921E−02 | 1.524018153E+00 |
| $A_4$ | 3.823031376E−02 | 8.778900757E−01 |
| $A_6$ | 3.518063967E−03 | −1.557286522E+00 |
| $A_8$ | 1.858860704E−02 | 1.879314685E+00 |
| $A_{10}$ | −2.594878831E−02 | −1.370939101E+00 |
| $A_{12}$ | 2.385687100E−02 | 1.300798787E+00 |
| $A_{14}$ | −1.122473371E−02 | −2.270369528E+00 |
| $A_{16}$ | 2.344349476E−03 | 2.611797039E+00 |
| $A_{18}$ | −8.484603101E−05 | −1.482269017E+00 |
| $A_{20}$ | −8.752092239E−06 | 3.299435201E−01 |

<Various Data>

| | |
|---|---|
| Wavelength λ (nm) | 408.00 |
| NA | 0.850 |
| Focal length f (mm) | 1.7654 |
| Back focal length bf (mm) | 0.5640 |
| Refractive index N | 1.525 |
| Focal length of light source side surface $f_1$ | 3.311 |
| Thickness of lens on optical axis d (mm) | 2.253 |
| Effective aperture $D_e$ | 3.00 |
| Outer diameter $D_O$ | 4.00 |
| Working distance WD (mm) | 0.502 |
| g (mm) | 1.333 |
| Mass (grams) | 0.015 |
| Abbe number ν | 55.91 |
| t1 (mm) | 0.1000 |
| On-axis wavefront aberration (λRMS) | 0.0019 |
| Off-axis wavefront aberration (λRMS) | 0.029 |

Figure 8:
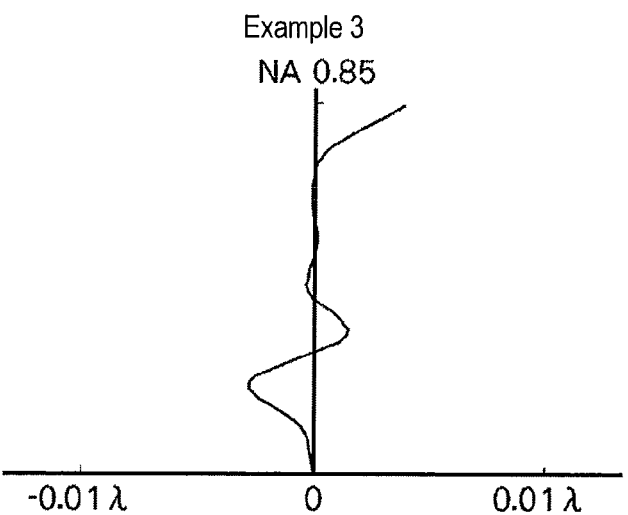
FIG. 8 is a wavefront aberration view illustrating the objective lens according to Example 3 of the invention.

The objective lens according to Example 3 can achieve a large NA of 0.85 when a wavelength λ of the used light is 408.0 nm. In addition, as shown in FIG. 8 and the value of the on-axis wavefront aberration in Table 3, the wavefront aberration is good, and the lens can satisfactorily converge the used light onto the optical recording layer 9b of the optical recording medium 9. Further, the objective lens according to Example 3 is configured to secure a sufficient working distance of 0.502 mm as shown in Table 3. Also, since an off-axis wavefront aberration is 0.029 λRMS as shown in Table 3, the objective lens according to Example 3 can achieve excellent image height characteristics. Also, the objective lens according to the Example 3 can achieve reduction in weight, that is, a mass thereof is 0.015 grams, as shown in Table 3.

Figure 12:
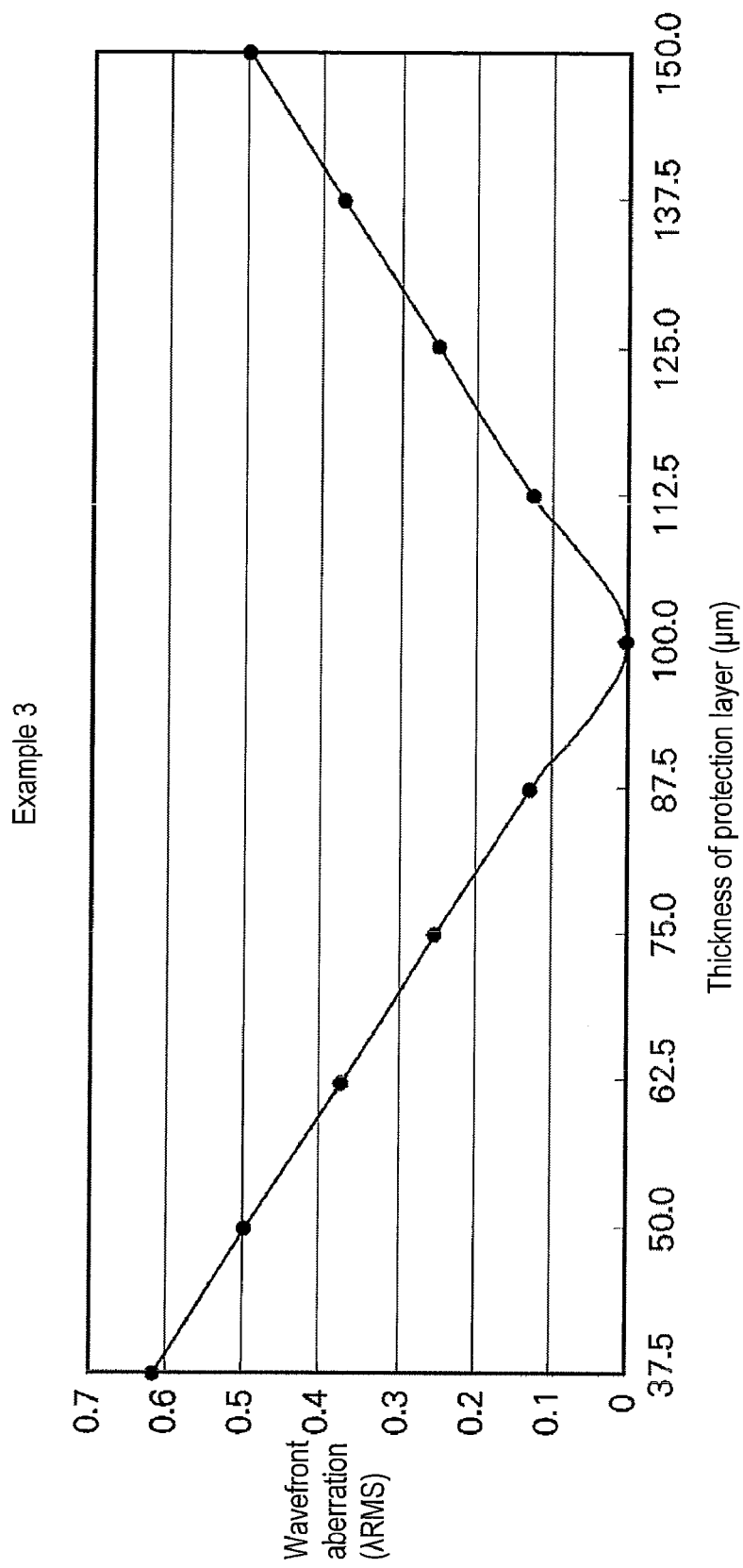
FIG. 12 is a view illustrating relationship between wavefront aberration and a thickness of a protection layer of the objective lens according to Example 3 of the invention.

In the objective lens 8 according to Example 3, the optical recording medium 9 is assumed as a single layer disk. The objective lens according to Example 3 is configured to minimize a wavefront aberration at the position distant 0.1 mm from the surface of the optical recording medium 9, and the on-axis wavefront aberration at this position is 0.0019 λRMS, as shown in FIG. 12.

Example 4

The objective lens 8 according to Example 4 is formed of a single lens made of glass. As shown in FIG. 4, the light source side surface 8a and the optical recording medium side surface 8b are convex surfaces near the optical axis, and the light source side surface 8a is the convex surface having a larger curvature than the optical recording medium side surface 8b. Furthermore, both the surfaces of the objective lens 8 according to this example are aspheric surfaces each of which is rotationally symmetric. In addition, the optical recording medium side surface of the objective lens 8 according to this example is the convex shape near the optical axis, and is formed in a concave shape at a predetermined position distant from the optical axis AX.

As for data according to Example 4, the upper part of the following Table 4 shows lens data, the middle part thereof shows aspheric surface data, and the lower part thereof shows various data.

TABLE 4

Example 4

<Lens Data>

| Surface | Radius of curvature R (mm) | Surface spacing D (mm) | Refractive index N |
|---|---|---|---|
| 1 | Aspheric | 2.580 | 1.605 |
| 2 | Aspheric | 0.721 | 1.000 |
| 3 | ∞ | 0.0875 | 1.619 |
| 4 | ∞ | | |

<Aspheric Surface Data>

| | 1st surface | 2nd surface |
|---|---|---|
| C | 0.665963094 | −0.241274788 |
| K | 1.485482017E−01 | −1.592117057E+00 |
| $A_4$ | 1.458997407E−02 | 2.062426083E−01 |
| $A_6$ | 1.248696532E−03 | −1.965367777E−01 |
| $A_8$ | 2.034812605E−03 | 1.092415726E−01 |
| $A_{10}$ | −1.289837288E−03 | −2.610313432E−02 |
| $A_{12}$ | 6.134250622E−04 | −4.565082721E−03 |
| $A_{14}$ | −1.409898547E−04 | 4.109929533E−03 |
| $A_{16}$ | 1.313656939E−05 | −6.899202346E−04 |
| $A_{18}$ | 0.000000000E+00 | 0.000000000E+00 |

TABLE 4-continued

Example 4

| $A_{20}$ | 0.000000000E+00 | 0.000000000E+00 |
|---|---|---|

<Various Data>

| Wavelength λ (nm) | 405.00 |
|---|---|
| NA | 0.850 |
| Focal length f (mm) | 2.2000 |
| Back focal length bf (mm) | 0.7747 |
| Refractive index N | 1.605 |
| Focal length of light source side surface $f_1$ | 3.982 |
| Thickness of lens on optical axis d (mm) | 2.580 |
| Effective aperture $D_e$ | 3.74 |
| Outer diameter $D_O$ | 5.00 |
| Working distance WD (mm) | 0.721 |

TABLE 4-continued

Example 4

| g (mm) | 1.539 |
|---|---|
| Mass (grams) | 0.073 |
| Abbe number ν | 59.96 |
| t1 (mm) | 0.0875 |
| On-axis wavefront aberration (λRMS) | 0.0016 |
| Off-axis wavefront aberration (λRMS) | 0.029 |

Figure 9:
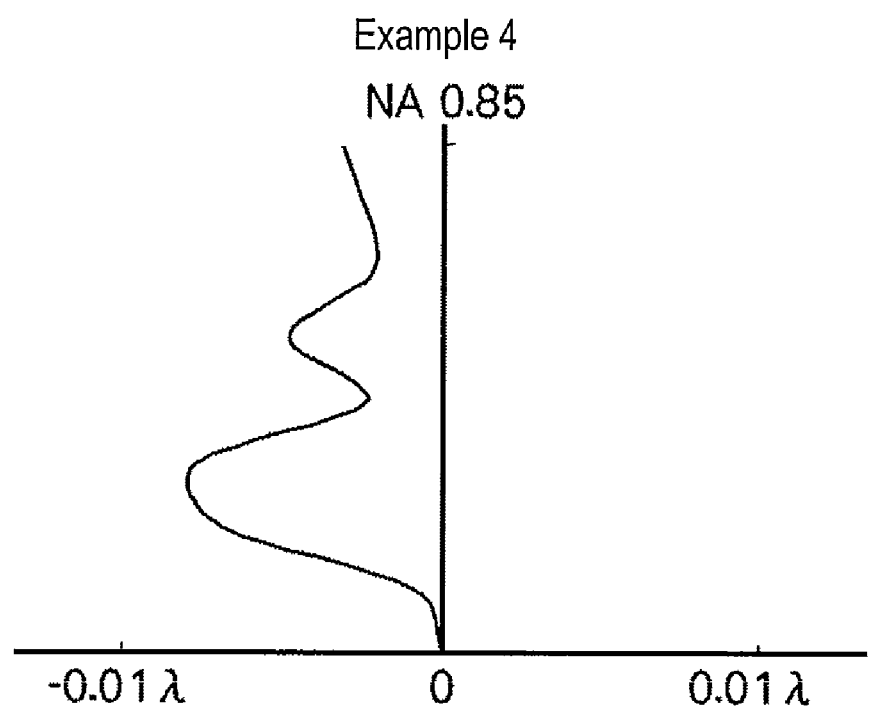
FIG. 9 is a wavefront aberration view illustrating the objective lens according to Example 4 of the invention.

The objective lens according to Example 4 can achieve a large NA of 0.85 when a wavelength λ of the used light is 405.0 nm. In addition, as shown in FIG. 9 and the value of on-axis wavefront aberration in Table 4, the wavefront aberration is good, and the lens can satisfactorily converge the used light onto the optical recording layer 9b of the optical recording medium 9. Further, the objective lens according to Example 4 is configured to secure a sufficient working distance of 0.721 mm as shown in Table 4. Also since an off-axis wavefront aberration is 0.029 λRMS as shown in Table 4, the objective lens according to Example 4 can achieve excellent image height characteristics. Also, the objective lens according to Example 4 can achieve reduction in weight, that is, a mass thereof is 0.073 grams, as shown in Table 4.

Figure 13:
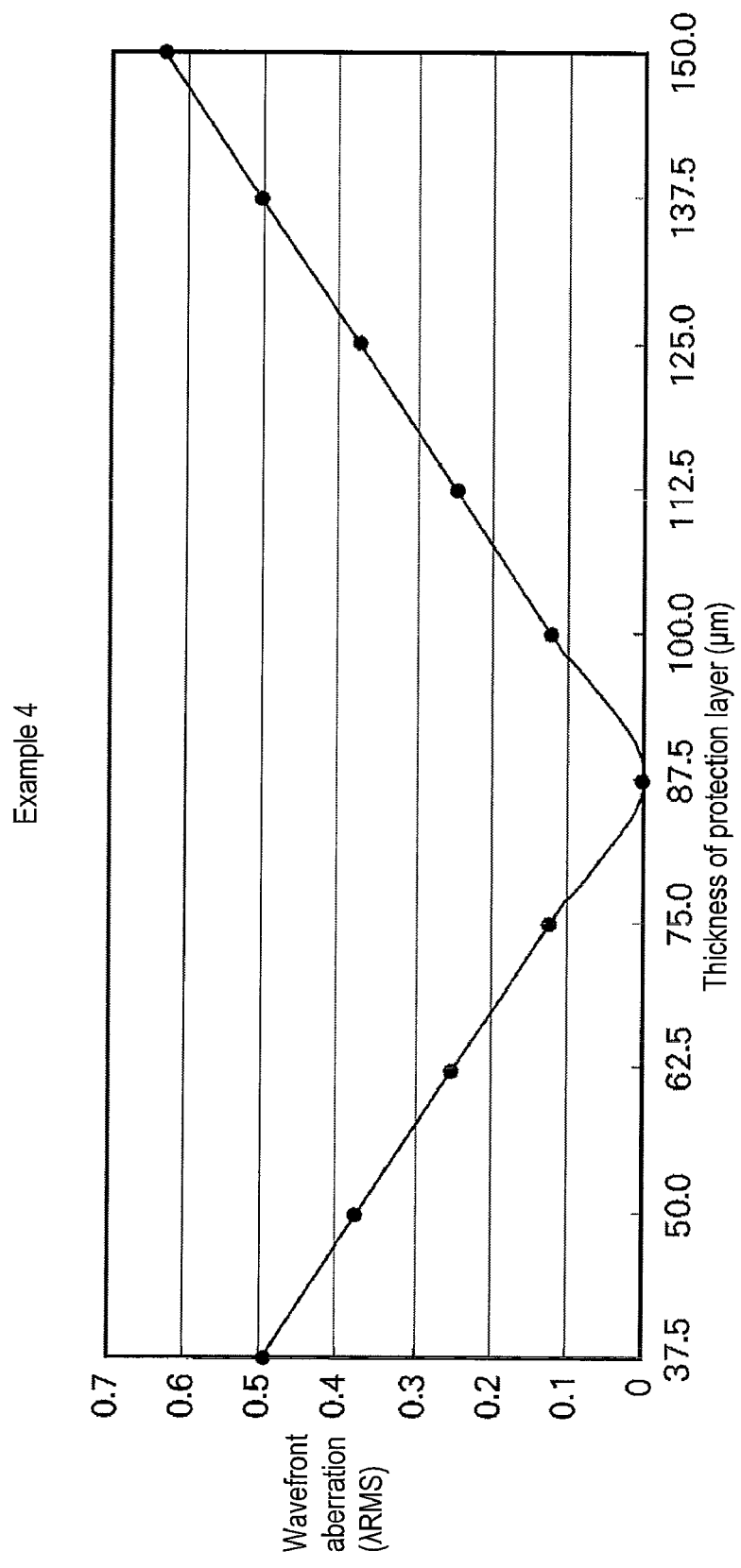
FIG. 13 is a view illustrating relationship between wavefront aberration and a thickness of a protection layer of the objective lens according to Example 4 of the invention.

In the objective lens 8 according to Example 4, the optical recording medium 9 is assumed as a double layer disk, and in order to deal with the double layer disk, aberration is set to take a good value at an intermediate position between the two recording layers. Consequently, the objective lens 8 according to Example 4 is configured to minimize a wavefront aberration at the position distant 0.0875 mm from the surface of the optical recording medium 9, and the on-axis wavefront aberration at this position is 0.0016 λRMS, as shown in FIG. 13.

Table 5 shows values corresponding to the conditional expressions (1) to (6) in Examples 1 to 4. As shown in Table 5, all the Examples 1 to 4 satisfy the conditional expressions (1) to (6) (including (4-1)).

TABLE 5

| Example | Cond. (1) N | Cond. (2) f/$f_1$ | Cond. (3) d/(NA · De) | Cond. (4) d/$D_o$ | Cond. (5) g/d | Cond. (6) ν |
|---|---|---|---|---|---|---|
| 1 | 1.60532 | 0.539 | 0.852 | 0.482 | 0.596 | 59.96 |
| 2 | 1.60532 | 0.537 | 0.852 | 0.482 | 0.595 | 59.96 |
| 3 | 1.52522 | 0.533 | 0.883 | 0.563 | 0.592 | 55.91 |
| 4 | 1.60532 | 0.552 | 0.812 | 0.516 | 0.597 | 59.96 |

Figure 15:
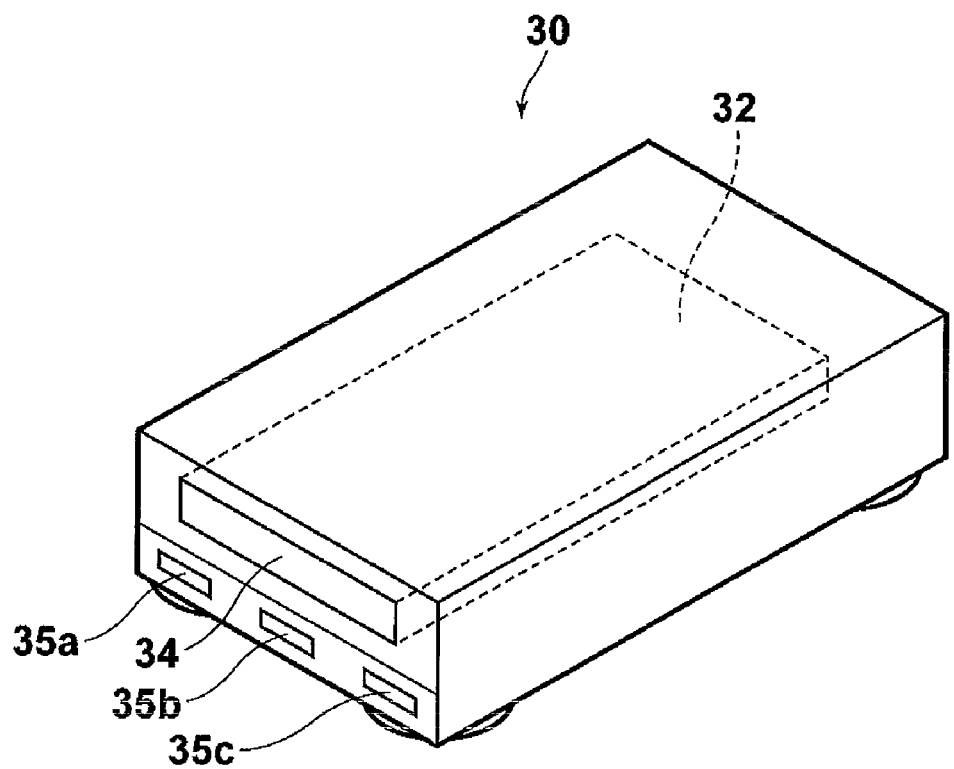
FIG. 15 is a schematic perspective view illustrating an optical recording/reproducing apparatus according to an embodiment of the invention.

Next, an optical recording/reproducing apparatus according to an embodiment of the invention will be described with reference to FIG. 15. FIG. 15 is a schematic perspective view illustrating an optical recording/reproducing apparatus 30 according to this embodiment of the invention. The optical recording/reproducing apparatus 30 has the optical pickup device 32 according to the embodiment of the invention therein. The front side of the apparatus 30 is provided with an insertion portion 34 for inserting an optical recording medium, and operation buttons 35a, 35b, and 35c for performing various operations such as recording, reproducing, and pause. In addition, since the optical recording/reproducing apparatus 30 has the objective lens according to the embodiment of the invention, it is possible to satisfactorily record onto or reproduce from an optical recording medium such as a blu-ray disk.

Although the invention has been described through the embodiments and examples as above, the invention is not limited thereto, and may be modified in various manner. For example, values of radiuses of curvature, aspheric coefficients, on-axis surface spacings, and refractive indices of lens components are not limited to the values shown in the numerical examples, and may have different values.

For example, the objective lens according to the invention is not limited to the configuration in which both of the light source side surface and the optical recording medium side surface are formed as rotationally symmetric aspheric surfaces similarly to the examples. When at least one surface thereof (in a case of one surface, it is preferable to select the light source side surface) is an aspheric surface, the other surface may be a flat surface or a spherical surface.

Further, in the above embodiment, it is preferable that the NA be not less than 0.85, and the objective lens having an NA of 0.85 is used as an example of an objective lens. However, even if the objective lens is designed such that a numerical aperture is slightly less than 0.85, the other conditions or specifications of the objective lens can be properly modified to eliminate inconvenience caused by the NA slightly less than 0.85. As a result, the objective lens may be used in an optical pickup device for an optical recording/reproducing apparatus based on a standard specification in which an NA thereof is 0.85.

For example, the number of the operation buttons and the optical pickup device, which are provided on the optical recording/reproducing apparatus according to the embodiment of the invention, is not limited to the example shown in FIG. 15, and may be set optionally.

In the description of the embodiments, the blu-ray disk is used as an optical recording medium, but the invention is not always limited to this. The objective lens, the optical pickup device, and the optical recording/reproducing apparatus according to embodiment of the invention may be also applied to the case of using an optical recording medium for different short wavelength light as the optical recording medium, for example, so-called AOD (HD-DVD) disk or the like.

Furthermore, in the future, an optical recording medium having a standard in which a wavelength of the used light is further shortened to ultraviolet region may be developed. However, even in this case, the invention may be applied. In this case, as a lens material, it is preferable to use a material having excellent transmittance to a wavelength of the used light. For example, it is possible to use fluorite or quartz as a lens material of the objective lens according to the invention.

What is claimed is:

1. An objective lens for converging light emitted from a light source onto an optical recording medium to record and reproduce information, the objective lens consisting of:
a single lens having at least one aspheric surface, wherein the following conditional expressions (1) to (3) are satisfied:

$$N \leq 1.75 \tag{1}$$

$$0.5 < f/f_1 < 0.6 \tag{2}$$

$$0.8 < d/(NA \cdot De) < 1.0 \tag{3}$$

where
N denotes a refractive index of the single lens,
f denotes a focal length, in mm, of the single lens,
$f_1$ denotes a focal length, in mm, of a light source side surface of the single lens,
d denotes a thickness, in mm, of the single lens on an optical axis,
NA denotes a numerical aperture of the single lens on an optical recording medium side, and
De denotes an effective aperture, in mm, of the light source side surface of the single lens.

2. The objective lens according to claim 1, wherein the objective lens is formed in a biconvex shape near the optical axis.

3. The objective lens according to claim 1, wherein an optical recording medium side surface of the objective lens is formed in a convex shape near the optical axis, and is formed in a concave shape at a predetermined position distant from the optical axis.

4. The objective lens according to claim 1, wherein a mass of the objective lens is equal to or less than 0.5 grams.

5. The objective lens according to claim 1, wherein the following conditional expression (5) is satisfied:

$$0.50 < g/d < 0.80 \tag{5}$$

where g denotes a distance, in mm, from a tangential plane that is perpendicular to the optical axis and is tangent to a vertex of the light source side surface of the single lens to a center of gravity of the single lens.

6. The objective lens according to claim 1, wherein a numerical aperture of the single lens on the optical recording medium side is not less than 0.70 and not more than 0.98.

7. The objective lens according to claim 1, wherein a wavelength of the light is not less than 400.0 nm and not more than 410.0 nm.

8. The objective lens according to claim 7, wherein
the numerical aperture of the single lens on the optical recording medium side is not less than 0.85, and
a thickness of a protection layer of the optical recording medium is not less than 0.075 mm and not more than 0.1 mm.

9. The objective lens according to claim 7, wherein
the numerical aperture of the single lens on the optical recording medium side is not less than 0.85,
an RMS of wavefront aberration is set to be minimized at a position distant t1 mm from a surface of the optical recording medium toward the inside of the optical recording medium, and
t1 is not less than 0.075 mm and not more than 0.1 mm.

10. An optical pickup device comprising:
the objective lens according to claim 1.

11. An optical recording/reproducing apparatus comprising:
the optical pickup device according to claim 10.

12. An objective lens for converging light emitted from a light source onto an optical recording medium to record and reproduce information, the objective lens consisting of:
a single lens having at least one aspheric surface, wherein the following conditional expressions (1), (2), and (4) are satisfied:

$$N \leq 1.75 \tag{1}$$

$$0.5 < f/f_1 < 0.6 \tag{2}$$

$$0.3 < d/Do < 0.8 \tag{4}$$

where
N denotes a refractive index of the single lens,
f denotes a focal length, in mm, of the single lens,
$f_1$ denotes a focal length, in mm, of a light source side surface of the single lens, d denotes a thickness, in mm, of the single lens on an optical axis, and Do denotes an outer diameter, in mm, of the single lens.

13. The objective lens according to claim 12, wherein the objective lens is formed in a biconvex shape near the optical axis.

14. The objective lens according to claim 12, wherein an optical recording medium side surface of the objective lens is formed in a convex shape near the optical axis, and is formed in a concave shape at a predetermined position distant from the optical axis.

15. The objective lens according to claim 12, wherein a mass of the objective lens is equal to or less than 0.5 grams.

16. The objective lens according to claim 12, wherein the following conditional expression (5) is satisfied:

$$0.50 < g/d < 0.80 \qquad (5)$$

where g denotes a distance, in mm, from a tangential plane that is perpendicular to the optical axis and is tangent to a vertex of the light source side surface of the single lens to a center of gravity of the single lens.

17. The objective lens according to claim 12, wherein a numerical aperture of the single lens on the optical recording medium side is not less than 0.70 and not more than 0.98.

18. The objective lens according to claim 12, wherein a wavelength of the light is not less than 400.0 nm and not more than 410.0 nm.

19. The objective lens according to claim 18, wherein a numerical aperture of the single lens on the optical recording medium side is not less than 0.85, and a thickness of a protection layer of the optical recording medium is not less than 0.075 mm and not more than 0.1 mm.

20. The objective lens according to claim 18, wherein a numerical aperture of the single lens on the optical recording medium side is not less than 0.85, an RMS of wavefront aberration is set to be minimized at a position distant t1 mm from a surface of the optical recording medium toward the inside of the optical recording medium, and t1 is not less than 0.075 mm and not more than 0.1 mm.

* * * * *